United States Patent [19]

Larikka

[11] 4,414,835

[45] Nov. 15, 1983

[54] FLANGE FORMING DRILL APPARATUS

[75] Inventor: Leo Larikka, Vaasa, Finland

[73] Assignee: G. A. Serlachius Oy, Finland

[21] Appl. No.: 305,649

[22] PCT Filed: Jan. 29, 1981

[86] PCT No.: PCT/FI81/00006
§ 371 Date: Sep. 24, 1981
§ 102(e) Date: Sep. 24, 1981

[87] PCT Pub. No.: WO81/02118
PCT Pub. Date: Aug. 6, 1981

[30] Foreign Application Priority Data

Jan. 30, 1980 [FI] Finland .................................. 800280

[51] Int. Cl.$^3$ ....................... B21D 31/02; B21D 53/00
[52] U.S. Cl. ......................................... 72/71; 72/325; 72/72
[58] Field of Search ....................... 72/70, 71, 72, 325; 29/257 T

[56] References Cited

U.S. PATENT DOCUMENTS

| | | | |
|---|---|---|---|
| 3,592,038 | 7/1971 | Larikka | 72/325 |
| 3,714,808 | 2/1973 | Larikka | 72/325 |
| 3,844,149 | 10/1974 | Hansen | 72/71 |
| 3,884,060 | 5/1975 | Larikka | 72/71 |
| 4,307,593 | 12/1981 | Riggs | 72/325 |

Primary Examiner—Lowell A. Larson
Attorney, Agent, or Firm—Mason, Kolehmainen, Rathburn & Wyss

[57] ABSTRACT

Flange forming drill apparatus for producing a flanged hole in a workpiece such as the side of a pipe or the like includes a body supporting a rotating drill rod and legs for supporting the body to move toward and away from the workpiece. A drill bit is provided at the end of the drill rod for drilling a hole upon movement of the body towards the workpiece along the support legs and a plurality of flange forming members are mounted on an end portion of the drill rod for movement between a retracted position while the hole is drilled and an outwardly projecting position for forming a flange around the edge of the hole when the body is moved away from the workpiece. An adjustment member on the drill rod is provided for moving the flange forming members between retracted and extended positions and brake bits are mounted on the legs for engagement by the adjustment member for extending the flange forming members when the hole is completed. A drive clutch assembly is provided for selective engagement with the rotating drill rod to automatically move the body away from the workpiece at substantially the same time that the flange forming members are extended to form a flange around the edge of the drilled hole.

13 Claims, 5 Drawing Figures

FLANGE FORMING DRILL APPARATUS

BACKGROUND OF THE INVENTION

1. Field of the Invention

The present invention relates to flange forming drill apparatus for drilling a hole in the side of a pipe or the like and forming a hole encircling flange around the edge of the drilled hole. The drill apparatus includes a body supporting a drill rod thereon with legs for supporting the body to move toward and away from the pipe or workpiece. A drill bit is provided at the end of the drill rods for forming the hole upon movement of the body towards the workpiece and a plurality of flange forming members are mounted adjacent the end of the drill rod for movement between a retracted position while the hole is drilled and an outwardly extending flange forming position after drilling is completed in order to form a flange around the edge of the hole as the body is moved away from the workpiece. An adjustment cone is mounted on the drill rod to move the flange forming members between the retracted and extended position and brake bits or stops are provided on the legs for engagement by the adjusting cone for extending the flange members after the hole is drilled. A drive clutch assembly is provided to automatically move the body away from the workpiece after the hole is drilled while the flange forming members are extended in order to form a flange around the edge of the hole. The clutch includes nut elements selectively movable to engage and disengage with respect to a feed screw provided on the drill rod.

2. Description of the Prior Art

Useful flange forming drill apparatus is disclosed in U.S. Pat. Nos. 3,592,038 and 3,714,808. The apparatus disclosed in these patents has proven useful for forming flanged holes in the side of pipes and the like for the connection of branches thereto.

OBJECT OF THE INVENTION

An object of the present invention is to provide a new and improved flange forming drill apparatus capable of automatic operation to form a flange around the edge of the drill hole when the drilling is completed without interruption in the operation.

BRIEF SUMMARY OF THE INVENTION

The foregoing object is accomplished in an illustrated embodiment described herein which includes a drive clutch apparatus having a feed nut assembly operable to open and close automatically into driving engagement with a feedscrew on the drill rod when the body of the apparatus reaches a predetermined position on the support legs so that the feed nut is automatically closed at substantially the same time that the flange forming members are moved from the retracted to the extended position after the hole is completed. Closing of the feed nut around the feedscrew on the rotating drill rod initiates movement of the body away from the workpiece while the flange forming members are extended to automatically begin the formation of a flange around the edges of the drilled hole as the body moves away.

BRIEF DESCRIPTION OF THE DRAWINGS

For a better understanding of the present invention, reference should be had to the following detailed description taken in conjunction with the drawings, in which.

DESCRIPTION OF A PREFERRED EMBODIMENT

Figure 1:
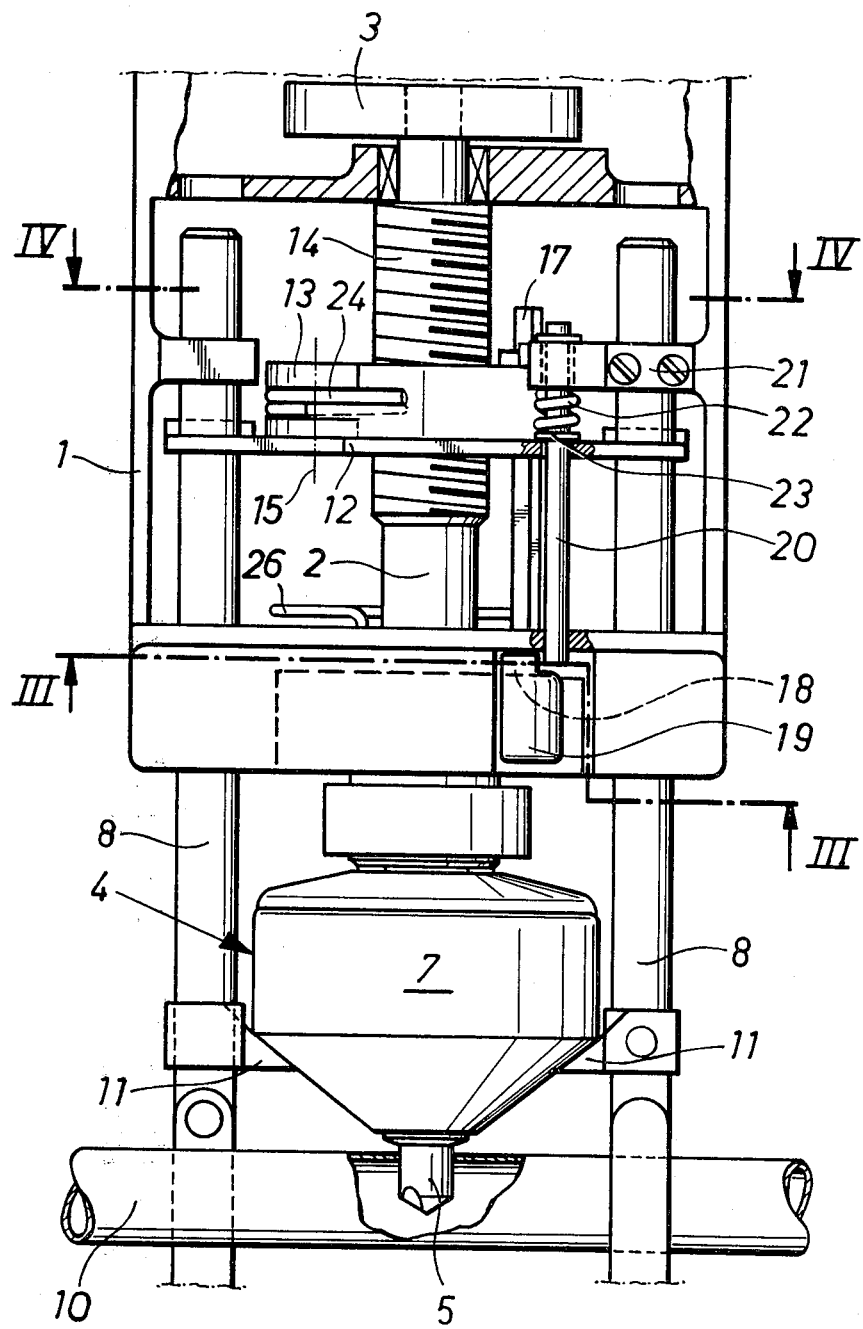
FIG. 1 is an elevational view of a new and improved flange forming drill apparatus in accordance with the invention with portions shown in section and illustrating the apparatus in a position wherein the drilled hole has been completed and the automatic flange forming operation is ready to commence.

In accordnce with the present invention a new and improved flange forming apparatus includes a body 1 on which is rotatably journalled a drive shaft 2 having a toothed gear 3 at the upper end driven by a power source such as a drive motor, not shown. The lower end of the drive shaft is connected to a head portion 4 which includes a drill rod having a drill bit 5 at the lower end. A plurality of flange forming members or pins 6 are extended crosswise through bores provided in the drill rod and the flange forming members 6 are movable between a retracted position (FIG. 1) and an extended, flange forming, position (FIG. 2) as described more fully in co-pending U.S. Patent application Ser. No. 305,650 filed simultaneously herewith.

The head portion 4 includes a smooth protective outer shield 7 having a frustoconically shaped lower end portion which encircles and encloses an adjustment cone mounted on the drill rod to engage the flange forming pins for moving the pins between the extended and retracted positions upon relative rotation of the adjustment cone on the drill rod. The outer protective shield 7 is secured to the internal adjustment cone so that relative rotation of the shield on the drill rod is effective to extend and retract the flange forming members 6 as desired.

Referring to the aforementioned co-pending U.S. Patent application, upward axial movement of the shield and cone on the drill rod away from the drill bit 5 permits rotation of the cone on the drill rod for moving the flange forming pins between the extended and retracted positions. The cone is biased downwardly toward a lower position on the drill rod and in the lower position the pins are locked in a selected position either extended or retracted.

Figure 2:
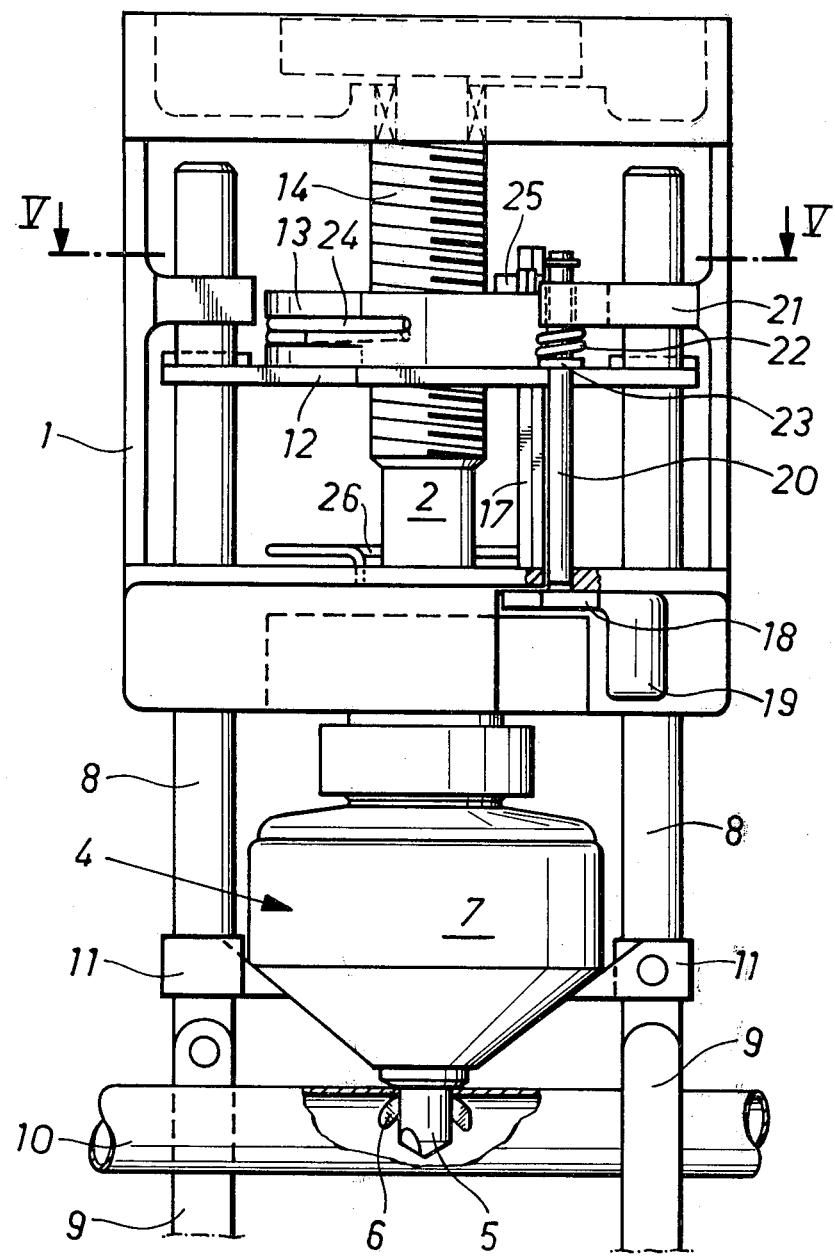
FIG. 2 is an elevational view similar to FIG. 1 illustrating the apparatus in a position with the drill bit extended into the drilled hole a slight distance further so that the flange forming members are moved to an extended position.

The body 1 is supported for movement toward and away from a workpiece 10 such as a pipe by a plurality of support legs 8 in parallel and on opposite sides of the axis of the drill rod. The support legs have hook-shaped ends 9 which are engaged with the pipe or workpiece 10 as illustrated. Each support leg 8 is provided with a brake bit or stop 11 spaced a selected distance from the hooked end 9 of the leg, so that after a hole has been drilled through the side of the pipe (as shown in FIG. 1) and the drill bit 5 is extending into the interior of the pipe, the lower frustoconical surface of the cone shield 7 frictionally engages the upper surfaces of the brake bits and causes a slight upward lifting of the shield on the drill rod. This action results in relative rotation of the adjustment cone on the drill rod causing the flange forming pins 6 to be extended outwardly to the flange forming position as shown in FIG. 2.

Engagement between the rotating frustoconical surface of the shield 7 and the brake bits 11 tends to retard rotation of the shield by frictional force while continued rotation of the drill shaft 2 results in relative rotation of the adjustment cone on the drill rod to extend the pins 6 to the flange forming position.

In accordance with the invention the apparatus includes a drive clutch assembly having a plate or base 12 extending between the legs 8 and on which is mounted a feed nut 13 selectively controllable to engage and disengage from a feed screw 14 on the drive shaft 2. The feed nut 13 includes a pair of nut members or halves pivotally connected by an axial pin 15 and a spring 24 is provided to bias the nut members towards a closed position in driving engagement with the feed screw 14. End portions of the nut elements opposite the pivotally connected ends are adapted and positioned to engage a cam member 16 which is mounted therebetween. The cam is movable from a first position as shown in FIG. 4 wherein the nut elements are maintained or held in an open or disengaged position with respect to the feed screw 14 and a second position as shown in FIG. 5 wherein the spring 24 biases the nut elements 13 together into closed engagement with the screw 14 for moving the body 1 and drill bit 5 upwardly on the legs 8 away from the workpiece.

Figure 4:
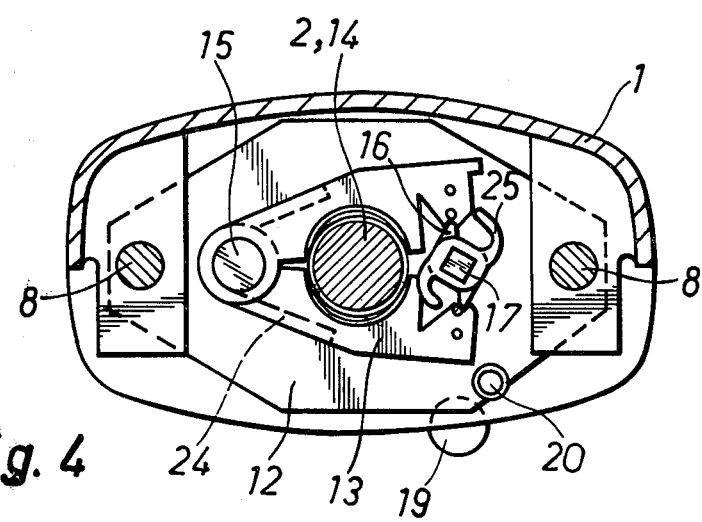
FIG. 4 is a transverse cross-sectional view taken substantially along the lines IV—IV in FIG. 1.
Figure 5:
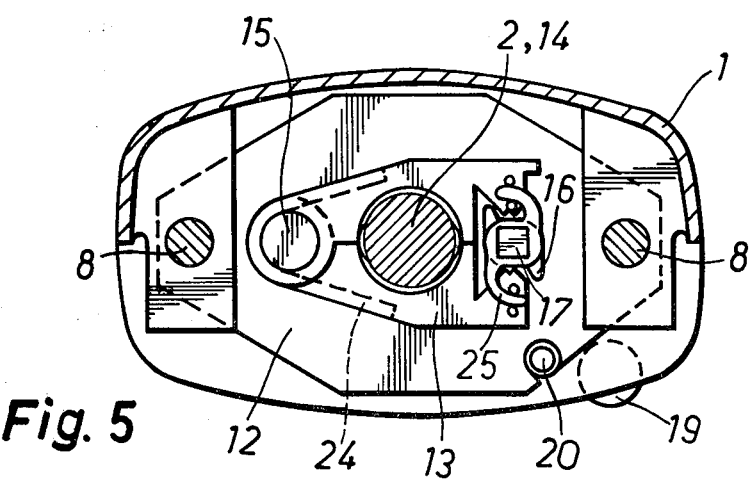
FIG. 5 is a transverse cross-sectional view taken substantially along line V—V of FIG. 2.

A plurality of latch arms 25 are provided on the cam 16 for keeping the nut elements in the closed position as shown in FIG. 5 and the cam is mounted on a member 17 which is provided with a manually operable lever 18 at the lower end. The lever 18 includes enlarged outer ends 19 for better gripping in order to manually pivot the lever from a first position as shown in FIG. 4 in which the cam 16 is positioned between the feed nut elements to maintain the feed nut 13 in the open position. and a second position as shown in FIG. 5 wherein the nut elements are closed and maintained in the closed position by the latch arms 25.

In order to retain the cam element in the open position as shown in FIG. 4, the apparatus is provided with a retaining pin 20 which is longitudinally slideable in a guide member 21 secured to the body 1. The retainer pin 20 is biased downwardly by a spring 22 acting against a limit flange 23 which is engageable with the top surface of the plate 12 which extends across between the legs 8.

Figure 3:
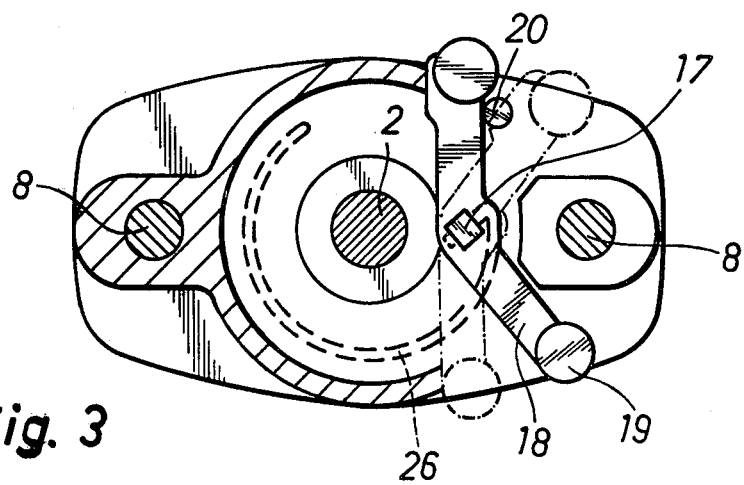
FIG. 3 is a transverse cross-sectional view taken substantially along lines III—III in FIG. 1.

When the body 1 is positioned on the legs at the level shown in FIG. 1, the retainer pin 20 is engageable with an arm of the lever 18 as shown in FIG. 3 and maintains the cam 16 in a position between the nut elements 13 to retain the feed nut in the open or disengaged condition while the hole is being drilled through the sidewall of the pipe 10. When the drill is moved further downwardly from the position of FIG. 1 after the hole is fully completed to the position of FIG. 2, the flange forming members or pins 6 are extended as previously described. As this occurs the lower end of the retainer pin 20 moves out of engagement with the lever 18 which is thereby released so that the springs 24 and 26 may effectively rotate the cam 16 from the position of FIG. 4 into the position of FIG. 5 wherein the latch arms 25 maintain the nut elements 13 in the closed position to engage the rotating feed screw 14 on the drive shaft 2. When this engagement occurs, the body 1 begins to move upwardly relative to workpiece 10 along with the rotating drill bit 5 and the extended flange forming pins 6. The rotating, extended pins gradually form a hole encircling flange in the wall of the workpiece as the body moves upwardly away.

The flange forming drill apparatus in accordance with the invention provides automation of two different functional steps, namely; a first step comprising extension of the flange forming pins 6 initiated by engagement of the shield 7 with the brake bits 11 when the hole is completed and almost simultaneously a second step wherein the feed nut elements 13 move from the open to the closed position as the retainer pin 20 moves out of engagement with the lever 18. The second step occurs as the drill shaft is pressed slightly downwardly with respect to supporting legs 8 just after the shield 7 first engages the brake bits 11.

Although the present invention has been described with reference to an illustrated embodiment thereof, it should be understood that numerous other modifications and embodiments can be made by those skilled in the art that will fall within the spirit and scope of the principles of this invention.

What is claimed as new and desired to be secured by Letters Patent is:

1. Flange forming drill apparatus for producing a flanged hole in a workpiece, comprising:
   a body supporting a rotating drill rod thereon;
   leg means supporting said body for movement toward and away from said workpiece;
   a drill bit adjacent an end portion of said drill rod for drilling a hole upon movement of said body toward said workpiece;
   a plurality of flange forming members mounted on said end portion of said drill rod for movement between a retracted position when a hole is drilled and an outwardly projecting, flange forming extended position for forming a flange around the edge of said hole upon movement of said body and away from said workpiece;
   adjustment means on said drill rod for moving said flange forming members between said retracted and said extended position;
   brake bit means on said legs engageable by said adjustment means for extending said flange forming members when said hole is completed; and
   drive clutch means on said leg means movable into and out of driving engagement with said rotating drill rod for moving said body away from said workpiece when said flange forming members are extended to form a flange around the edge of said hole.

2. The apparatus of claim 1 wherein said brake bit means and drive clutch means are positioned to effect substantially simultaneous extension of said flange forming members and movement of said body away from said workpiece.

3. The apparatus of claim 1 wherein said drive clutch means includes feed screw means on said drill rod and drive nut means supported from said leg means movable between an open position out of driving engagement with said feed screw means and a closed position in driving engagement with said feed screw means for moving said body away from said workpiece.

4. The apparatus of claim 3 wherein said drive nut means includes a plurality of nut elements pivotally interconnected for movement between said open and said closed position.

5. The apparatus of claim 4 including spring means for biasing said nut elements to pivot toward said closed position.

6. The apparatus of claim 5 wherein said drive clutch means includes cam means between said nut elements movable between alternate positions to open and close said drive nut means.

7. The apparatus of claim 6 wherein said cam means includes first means for engaging said nut means to maintain said nut elements in said open position and second means for gripping said nut elements to retain the same in said closed position.

8. The apparatus of claim 7 wherein said cam means and said nut elements include engaging surfaces tending to urge said nut elements toward said closed position.

9. The apparatus of claim 6 including means for biasing said cam means toward a position for closing said nut elements.

10. The apparatus of claim 6 including operator means for moving said cam means between said alternate positions for opening and closing said nut elements.

11. The apparatus of claim 10 wherein said operator means includes manual lever means for moving said cam means.

12. The apparatus of claim 10 wherein said operator means includes retainer means for securing said cam means in one of said alternate positions for maintaining said nut elements in said open position until said body reaches a preselected position on said leg means whereupon said retainer means releases said cam means to move to another of said alternate position for closing said nut elements.

13. The apparatus of claim 12 wherein said retainer means includes spring biased pin means responsive to the position of said body on said leg means for releasing said cam means to move to said other alternative position.

* * * * *